United States Patent [19]

Valenta

[11] 4,036,928

[45] July 19, 1977

[54] PROCESS FOR PELLETIZING SORPTIVE MINERAL FINES

[75] Inventor: Rudolph C. Valenta, Elmhurst, Ill.

[73] Assignee: Oil-Dri Corporation of America, Chicago, Ill.

[21] Appl. No.: 668,637

[22] Filed: Mar. 19, 1976

Related U.S. Application Data

[63] Continuation of Ser. No. 510,502, Sept. 30, 1974, abandoned, which is a continuation of Ser. No. 170,270, Aug. 9, 1971, abandoned.

[51] Int. Cl.$^2$ .............................................. B01J 2/10
[52] U.S. Cl. .................................. 264/118; 264/122; 264/143
[58] Field of Search ............... 264/117, 118, 141, 122, 264/143

[56] References Cited

U.S. PATENT DOCUMENTS

| 3,228,891 | 1/1966 | Duke | 264/117 |
|---|---|---|---|
| 3,287,480 | 11/1966 | Wechsler | 264/118 |

OTHER PUBLICATIONS

Agglomeration: Chemical Engineering magazine, pp. 147–160, McGraw-Hill Co., N.Y., Dec. 4, 1967.

*Primary Examiner*—Robert F. White
*Assistant Examiner*—J. R. Hall
*Attorney, Agent, or Firm*—Foorman L. Mueller

[57] ABSTRACT

A process for pelletizing sorptive mineral "fines" which includes adding sufficient moisture to the particles of sorptive material to occupy the pore space therein, compactly forming the moistened mineral in a pelletizing machine, then removing the pore moisture in a suitable dryer or kiln so that final pellets retain relatively the same absorbent capacity and bulk density as the original material.

11 Claims, No Drawings

PROCESS FOR PELLETIZING SORPTIVE MINERAL FINES

This is a continuation of application Ser. No. 510,502 filed Sept. 30, 1974, which is a continuation of Ser. No. 170,270, filed Aug. 9, 1971 both abandoned.

BACKGROUND OF THE INVENTION

For the purposes of this invention the term "sorptive minerals" is defined as clays, distomatious earth, fuller's earth and bentonite that are low in bulk density usually less than 45 lbs./cu. ft., and have the ability to absorb liquids into their pores. Sorptive materials usually contain more than one component but most often have a high percentage of attapulgite, or montmorillonite, or sepiolite, or diatomite. Generally a sorptive mineral that has any of the above as the major component is very likely to have lesser amounts of one or all of the others. Any of the other known clay minerals, such as Kaolinite and illite are commonly present and nonclay minerals and/or silicous materials that cannot be classified as diatomaceous earth may be present. Typical of the latter is silica sand, limestone, iron oxide and gypsum.

Sorptive minerals, which are used as industrial absorbents, soil conditioners, decorative mulch herbicides, insecticide carriers, cat box absorbent and sanitary absorbents for such things as vomit, are generally mined, dried and/or calcined, crushed and screened to a particle size, which depends on the particular use to which it will be applied. This crushing and screening inevitably leads to a waste products known as "fines," which for the purpose of this invention can be defined as a range of particles less than 50 mesh in size. While the "fines" from some specially selected and/or further processed sorptive minerals can be used, for instance, attapulgite as drilling mud, it is generally accepted within the industry that sorptive minerals which are best suited as an absorbent or for decorative purposes and whicch grade down from 50 mesh have little market demand. In some products, depending on desired final particle size "fines" can be generated in an amount equal to 10% to 60% of the final merchantable product and for some products such as 16/30, 30/60 and 24/48 insecticide grades the "fines" lost will be on the high side of the above range. Obviously, if these "fines" cannot be used they represent an economic loss to the manufacturer and in fact create a disposal problem.

Various methods have been advanced for pelletising "fines" which generally involve processing the "fines" by compressing them into pellets of a useable size. These methods have proven satisfactory for pelletizing plastic, nonabsorbent clay "fines." Processes for pelletizing sorptive mineral "fines" which use collidial clay as a binder by agglomeration have also been advanced but for the most part have been unsatisfactory because it is difficult to control the pellet size and strength and the resulting pellets are unstable under certain environmental conditions and lack the qualities of the sorptive mineral.

SUMMARY OF THE INVENTION

It is an object of this invention to provide a process for pelletising sorptive mineral "fines" pellets of useful size.

It is another object of this invention to provide a process for pelletizing sorptive mineral "fines" into pellets of useful strength.

It is another object of this invention to provide a process for pelletizing sorptive mineral "fines" by compactly forming the same into useful pellets having the desired stability under most environmental conditions.

It is still another object of this invention to provide a process for pelletizing "fines" of sorptive minerals into pellets of useful size that retain substantially the same absorbent capacity and bulk density as the original material.

In accordance with one form of this invention "fines" of a sorptive mineral such as fuller's earth or diatomaceous earth are mixed with sufficient moisture to just fill the pore space in the particles. In one instance water was added in an amount equal to between 30 to 45 percent by weight to the "fines." Once the "fines" and moisture are mixed in a cement-type mixer, ribbon blender or other suitable mixing device, they are then placed in a pelletizing machine where the moistened "fines" are compactly formed into pellets by forcing the mixture through a die. After the pellets are formed they are cut to the desired size. The pellets are then dried driving the water from the pore space, with the result that the pellets have substantially the same absorbent capacity and bulk density as the original material.

DETAILED DESCRIPTION

In carrying out the present invention one of the important features is the mixing of water with the particles of a sorptive mineral which can be either raw or calcined and which has particle size less than 50 mesh. It should be noted that although this process was innovated to utilize "fines" which otherwise would be wasted, it is possible that if the producer did not have a buyer for particles less than 30 mesh in size they could be used in accordance with this process, and in fact it has been found practical to pelletize particles which will pass through a 20 mesh screen. The amount of moisture that is added depends on the absorbent capacity of the material and should be only enough to fill the pore space in the particle. It is definitely desirable to avoid forming a slurry. I have generally found that added moisture in the range of 30%–45% by weight to the sorptive mineral works satisfactorily and that 35% by weight appears to be the most optimum.

It would seem that the major error in prior attempts to pelletize sorptive mineral "fines" was the failure to realize that the pelletizing machine actually compressed the particles of sorptive mineral during the forming process thereby destroying the porosity of the particles. By adding moisture to the "fines" taking care to fill the pore space, since liquids cannot be compressed, the particles when formed into pellets are actually compacted together rather than compressed, with the liquid preserving the integrity of the original pore space. The liquid also acts as a lubricant on the surface of the particles to facilitate the forming of the pellets during the process.

The "fines" and water solution are mixed thoroughly in any suitable mixer and are then fed into the pelletizing machine for compacting the same into the pellets. Typically, the machine and die must not allow the water to be formed from the pores of the sorptive mineral which would result in a dense material having undesirable sorptive characteristics. The machine, for instance, could be a pellet machine of the known type such as that manufactured by Alexanderwerk, Renscheid, Germany which utilizes a solid drum revolving against a revolving perforated drum which acts as a die.

The solid drum forces the moistened "fines" through the perforated drum to compact the same to form the pellets. A knife extending into the perforated drum cuts the pellets to the desired length. Another suitable machine for forming the pellets is manufactured by the California Pellet Mill Co. In this device a perforated ring rotates around two smaller solid rings which act to force the moistened "fines" through the perforated ring compactly forming the pellets. An adjustable knife adjacent to the perforated ring cuts the pellets to size as they are formed. It is possible to control the size of the pellets made in the pelletizers by selecting the die size and adjusting the cutter.

After the pellets have been formed, they are transferred by conveyor to a drier where they are dried until the moisture is removed from the pore space. The temperature and time of drying is not critical as long as all the water is evaporated from the pore space. The dried pellets are then screened to remove any dust which may have developed in the process and passed by conveyor to a bagging machine where they are packed for shipment.

The pellets that are formed utilizing the invention so far described with respect to the sorptive mineral "fines" are strong, uniform in shape and size, and have an absorbent capacity and bulk density that approaches the original material. When wet they disintegrate into a powder which can be useful when using the pellets as an insecticide carrier.

I have found, however, that by carrying the invention one step farther it is possible to make the pellets more stable and I achieve this by adding a binder to the moistened "fines" in the mixer. Any common binder can be used such as sodium silicate, plaster of paris, portland cement, coloidal bonding clays and the like, depending on the degree of stability required. Particularly I found that adding portland cement in the range of 5-15% by weight of sorptive mineral coated the grains without significantly blocking the pores or reducing the absorbent capacity or increasing the bulk density of the pellets. Pellets made in accordance with the aforedescribed process after allowing the binder to cure or set were found to be very stable when they were subsequently subjected to moisture. Such pellets have found utility as oil and grease absorbent, cat box absorbent, nesting material, decorative mulch, sanitary absorbent and the like.

One of the truly beneficial features of this invention is the versatility which is achieved. That is, by varying the dies in the pelletizing machine, for instance, sorptive mineral "fines" can be compactly formed into pellets of varying sizes and shapes to be used as cat box absorbent, oil and grease absorbent, decorative mulch, nesting material, soil conditioner, sanitary absorbent, to effect the desired asthetic properties of decorative mulch, and other uses. Color pigments such as iron oxide or carbon black can be added in the case of decorative mulch, and deactivators and insecticides or herbicides can be mixed into the sorptive mineral prior to pelletizing to form pellets useful in the distribution of these chemicals. Also a commercially available deodorizer such as pine oil or wintergreen or the like can be added to neutralize odorous spills such as vomit, or cat box orders.

Without limiting the invention but in order that those skilled in the art may better understand the present invention the following specific examples are given:

1. Cat box absorbent.

a. 100 pounds of calcined fuller's earth from our Mississippi mine passing a 50 mesh screen is mixed with 35% by weight of water in a cement-type mixer and mixed thoroughly with 10% by weight of portland cement.

b. The mixture of (a) above is fed into a pellet machine made by the California Pellet Mill Co. which forms compacted pellets therefrom of approximately 8 mesh.

c. The pellets are dried in an oven at about 300° F. for approximately ½ hour.

d. The pellets are screened to remove any dust.

e. The pellets are bagged.

2. Oil and grease absorbent.

Steps (a)–(e) of 1 are repeated but the dies and the pelletizing machine are changed so that rectangular pellets of approximately 8 mesh are compactly formed. Pellets of this shape are preferred for this application.

3. Decorative mulch.

In step (a) of 1 above an iron oxide pigment is added in an amount to give the desired color to the clay.

In step (b) the dies are changed in the pellet machine to give a pellet size of ¾ inch and rectangular shape.

4. Insecticide carrier.

a. 100 pounds of less than 50 mesh calcined diatomaceous earth is mixed with 35% by weight of water and 10% by weight of portland cement and mixed thoroughly in a cement-type mixer.

b. The mixture of (a) is fed into a pellet machine manufactured by the Alexanderwerk and pellets are formed of approximately 1/16 inch mesh.

c. The pellets are dried in an oven at about 300° F. for ½ hour.

d. The dried pellets are screened to remove any dust.

e. The pellets are bagged.

5. Insecticide carrier.

a. 100 pounds of less than 50 mesh calcined fuller's earth is mixed with 35% by weight of water in a cement type mixer.

b. The mixture of (a) is fed into a pellet machine manufactured by the Alexanderwerk and pellets are formed of approximately 1/16 inch mesh.

c. The pellets are dried in an oven at about 300° F. for ½ hour.

d. The dried pellets are screened to remove any dust.

e. The pellets are bagged. Pellets compactly formed by this process were found to have the desired property of turning to powder when wet.

6. Cat box absorbent.

a. 100 pounds of calcined fuller's earth from our Georgia mine passing a 50 mesh screen is mixed with 40% by weight of water in a cement-type mixer and mixed thoroughly with 10% by weight of portland cement.

b. The mixture of (a) above is fed into a pellet machine manufactured by the Alexanderwerk which forms compacted pellets therefrom of approximately 8 mesh.

c. The pellets are dried in an oven at about 300° F. for approximately ½ hour.

d. The pellets are screened to remove any dust.

e. The pellets are bagged.

Although the examples which are shown use calcined sorptive minerals my tests have shown that noncalcined sorptive minerals can be used successfully.

What has been described, therefore, is a unique process for pelletizing sorptive minerals into pellets of controlled stability and of useful size that retain substantially the same absorbent capacity and bulk density as the original material.

I claim:

1. A process for making pellets from sorptive mineral fines having open pore spaces therein, which said fines include mineral particles that will pass through a 20 mesh screen, and said pellets have said open pore spaces therein and have a liquid absorption capacity substantially equal to that of the particular sorptive mineral fines used as the starting material for said pellets, said process comprising:
    a. mixing said sorptive mineral fines in a mixing apparatus with water to moisten said mineral fines and to substantially fill with water said open pore spaces within the particles of said mineral fines,
    b. transferring said moistened particles from said mixing apparatus to a pelletizing apparatus having a die and cutting means therewith,
    c. forcing said moistened mineral particles through said die to compactly form the mineral particles into a coherent mass of material while avoiding the forcing of said water from said pore spaces,
    d. cutting said coherent mass from said die to form said material into pellets,
    e. transferring said pellets to a dryer, and
    f. evaporating the water from said substantially filled pore spaces within said pellets to render said pore spaces open and provide said pellets with an absorption capacity in said open pore spaces approaching that capacity of said sorptive mineral fines starting material.

2. In the process of claim 1 wherein a binder is provided to said mixing apparatus to be mixed with said particles of said mineral fines without significantly blocking said pore spaces for the introduction of water therein, with said binder acting to make said pellets more stable.

3. In the process of claim 2 wherein said binder is portland cement.

4. In the process of claim 3 wherein said binder is provided in the range of 5% to 15% by weight of the sorptive mineral fines.

5. In the process of claim 3 for the making of said pellets to be used as a cat box absorbent wherein calcined sorptive mineral fines are used having said open pore spaces therein and include particles of a size to pass through a 50 mesh screen, and wherein said steps recited in paragraphs (a) to (f) inclusive of claim 1 are performed in said process.

6. In the process of claim 1 for producing a decorative mulch of a bulk density less than 45 pounds per cubic foot wherein a color pigment is provided to and mixed in said mixing apparatus with said particles of said mineral to provice pellets of a color resulting from the particular pigment added.

7. In the process of claim 1 wherein a liquid deodorizer is mixed with said pellets to provide those pellets which will neutralize odors when said pellets having the deodorizer therewith are used.

8. In the process of claim 1 wherein a chemical from the group consisting of deactivators and insecticides and herbicides is provided in said pellets for the purpose of distributing the chemical by means of distributing the pellets where the chemical is to be utilized.

9. In the process of claim 8 wherein said pellets are approximately 1/16 inch in size.

10. In the process of claim 1 wherein said sorptive mineral fines are of calcined fuller's earth and include particles that will pass through a 50 mesh screen, and wherein a binder of portland cement is provided to said mixing apparatus to be mixed with said mineral particles without significantly blocking said pore spaces of said particles for the introduction of water therein.

11. In the process of claim 1 wherein said sorptive mineral fines are particles selected from the group consisting of clays, diatomaceous earth, fuller's earth, and bentonite, said fines of a bulk density less than 45 pounds per cubic foot.

* * * * *